US010367927B2

(12) United States Patent
Shamsoddini et al.

(10) Patent No.: US 10,367,927 B2
(45) Date of Patent: Jul. 30, 2019

(54) WEARABLE DEVICE WITH AN ANTENNA SYSTEM

(71) Applicant: Logitech Europe S.A., Lausanne (CH)

(72) Inventors: Ahmad Shamsoddini, Cupertino, CA (US); Stephen Duddy, Moama (AU)

(73) Assignee: LOGITECH EUROPE, S.A., Lausanne (CH)

( * ) Notice: Subject to any disclaimer, the term of this patent is extended or adjusted under 35 U.S.C. 154(b) by 0 days.

(21) Appl. No.: 15/787,703

(22) Filed: Oct. 18, 2017

(65) Prior Publication Data

US 2018/0041617 A1 Feb. 8, 2018

Related U.S. Application Data

(63) Continuation-in-part of application No. 15/012,823, filed on Feb. 1, 2016, now abandoned.
(Continued)

(51) Int. Cl.
*H04M 1/02* (2006.01)
*H01Q 1/27* (2006.01)
(Continued)

(52) U.S. Cl.
CPC .......... *H04M 1/0277* (2013.01); *H01Q 1/273* (2013.01); *H01Q 1/38* (2013.01);
(Continued)

(58) Field of Classification Search
CPC .......... H01Q 1/243; H01Q 9/42; H01Q 5/378; H01Q 21/24; H01Q 9/0414; H01Q 13/16; H01Q 19/005; H01Q 5/00; H01Q 5/385; H01Q 5/392; H01Q 9/0435; H01Q 9/16; H01Q 9/27; H04B 17/318; H04B 7/0617; H04B 7/0691; H04B 1/0458; H04L 69/16; H04L 69/161; H04L 69/22; H04L 67/04;
(Continued)

(56) References Cited

U.S. PATENT DOCUMENTS 6,466,176 B1 * 10/2002 Maoz ............... H01Q 1/243
343/702
2005/0219843 A1 * 10/2005 Arell ............... H04M 1/05
362/253
(Continued)

*Primary Examiner* — Nimesh Patel
(74) *Attorney, Agent, or Firm* — Patterson & Sheridan, LLP

(57) ABSTRACT

A wearable device and methods for using the same provided. In one embodiment, a wearable device includes an antenna disposed in a controller and/or a band. The antenna is an electrically conductive element with three connection points, defining three segments. With one of the connection points driven and the other two grounded, the antenna has characteristics of an inverted-F antenna along with a parasitic element between the two grounded points, parasitic element altering the antenna's directionality. In an embodiment, the antenna includes apertures through which portions of a shielded cable protrude to allow conductors in each cable portion to connect to the printed circuit board which is enclosed within the periphery of the antenna. The shields of the cable portions connect to a ground plane of the printed circuit board and both the shields and the ground plane of the printed circuit board act as a ground for the antenna.

20 Claims, 11 Drawing Sheets

Related U.S. Application Data

(60) Provisional application No. 62/468,786, filed on Mar. 8, 2017.

(51) Int. Cl.
  *H01Q 13/10* (2006.01)
  *H01Q 1/38* (2006.01)
  *H01Q 9/42* (2006.01)
  *H01Q 9/04* (2006.01)

(52) U.S. Cl.
  CPC ............ *H01Q 9/42* (2013.01); *H01Q 13/10* (2013.01); *H01Q 9/04* (2013.01); *H04R 2460/03* (2013.01)

(58) Field of Classification Search
  CPC ... H04L 67/303; H04L 63/08; H04L 12/5895; H04L 67/025; H04L 67/125; G01S 3/12; G01S 3/20; H04W 12/06; H04W 4/008; H04W 4/02; H04W 88/02; H04W 68/005; H04W 4/021; H04W 4/023; H04W 4/027; H04W 4/028; H04W 76/023; H04W 12/04; H04W 12/08; H04W 24/02; H04W 40/244; H04W 4/005; H04W 4/206; H04W 88/06; H04W 84/18; H04W 28/18; H04W 48/16; H04W 84/12; H04W 8/005; H04M 1/7253; H04M 2250/02; H04M 2215/32; H04M 15/58; H04M 15/745; H04M 15/8016; H04M 1/05; H04M 1/6066; H04M 1/72519; H04M 1/72572; H04M 2215/2026; H04M 2215/7414; H04M 2250/12; H04M 1/6041; H04M 2250/06; H04M 2250/74
  See application file for complete search history.

(56) References Cited

U.S. PATENT DOCUMENTS

| | | | |
|---|---|---|---|
| 2007/0273611 A1* | 11/2007 | Torch | A61B 3/0066 345/8 |
| 2012/0202185 A1* | 8/2012 | Jabara | G09B 5/00 434/350 |
| 2013/0241779 A1* | 9/2013 | Korva | H01Q 1/243 343/700 MS |
| 2014/0036127 A1* | 2/2014 | Pong | H04R 1/028 348/333.01 |
| 2018/0254546 A1* | 9/2018 | Shamsoddini | H01Q 1/273 |

* cited by examiner

WEARABLE DEVICE WITH AN ANTENNA SYSTEM

CROSS-REFERENCE TO RELATED APPLICATIONS

This application is a continuation-in-part of U.S. patent application Ser. No. 15/012,823, filed on Feb. 1, 2016, which is hereby incorporated herein by reference. This application also claims the benefit of U.S. provisional patent application Ser. No. 62/468,786 filed on Mar. 8, 2017, which is also hereby incorporated herein by reference.

TECHNICAL FIELD

The present disclosure relates generally an antenna, and more particularly to an antenna integrated with a wearable electronic device.

BACKGROUND

Wearable electronic devices continue to grow in popularity and have become an integral part of personal communication. Wearable electronic devices may allow users to wirelessly receive high-fidelity audio data for playback and but may also track a user's fitness level, for example, by counting the user's steps, total calories burned, miles run, etc., and by monitoring the user's heart rate almost anywhere they travel. Moreover, as wearable electronic device technology has increased, so too has the functionality of wearable electronic devices. For example, such multi-function wearable devices may require users to wirelessly access the Internet via a cellular network and/or a wireless local area network (WLAN).

As the functionality of wearable electronic devices continues to increase, so too does the demand for smaller devices which are easier and more convenient for users to carry. One challenge this poses for wearable device manufacturers is designing housings that cooperate with antennas to provide desired operating characteristics within the relatively limited amount of space available.

Therefore, there is a need for a small and rugged wearable electronic device that can reliable communicate with other electronic components, while not unnecessarily burdening the user due its size or weight.

SUMMARY

In view of the above challenges, there is a long-felt need for wearable electronic devices to include an internal antenna configured to receive and transmit electromagnetic signals while still being sleek, mobile and lightweight. In one embodiment of the disclosure, in which the wearable device is a wearable fitness-monitoring device, being sleek, mobile, lightweight, and/or rugged allows a user to perform numerous activities while wearing the device. Moreover, antenna enables transmission and collection of data, such as data relating to the user's activity and the user's physical responses thereto, thus enabling the user to better track a multitude of fitness-and-health related data. Additionally, there is a long-felt-need for wearable devices that are simple and inexpensive to manufacture.

Various embodiments of the present disclosure include a wearable device configured with an internal antenna. In one embodiment, the wearable device includes earphones with a controller attached to each earphone via a cable and an optional band. The antenna may be placed inside the controller or band and may be configured as an electrically conductive layer which defines a perimeter of the controller of the wearable device. Additionally, portions of the wearable device itself may function as at least a portion of an antenna. The antenna may be limited to a fixed range of frequencies or may be configured to operate at a certain gain, frequency, bandwidth, and radiation pattern shape. The antenna may be formed from electrically conductive material such as metal or other electrically conductive materials that may include a supporting material such as a plastic material, a glass material, a ceramic composite material, or other suitable material. In other embodiments, the antenna may be configured as an electrically conductive coating on part of the wearable device.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
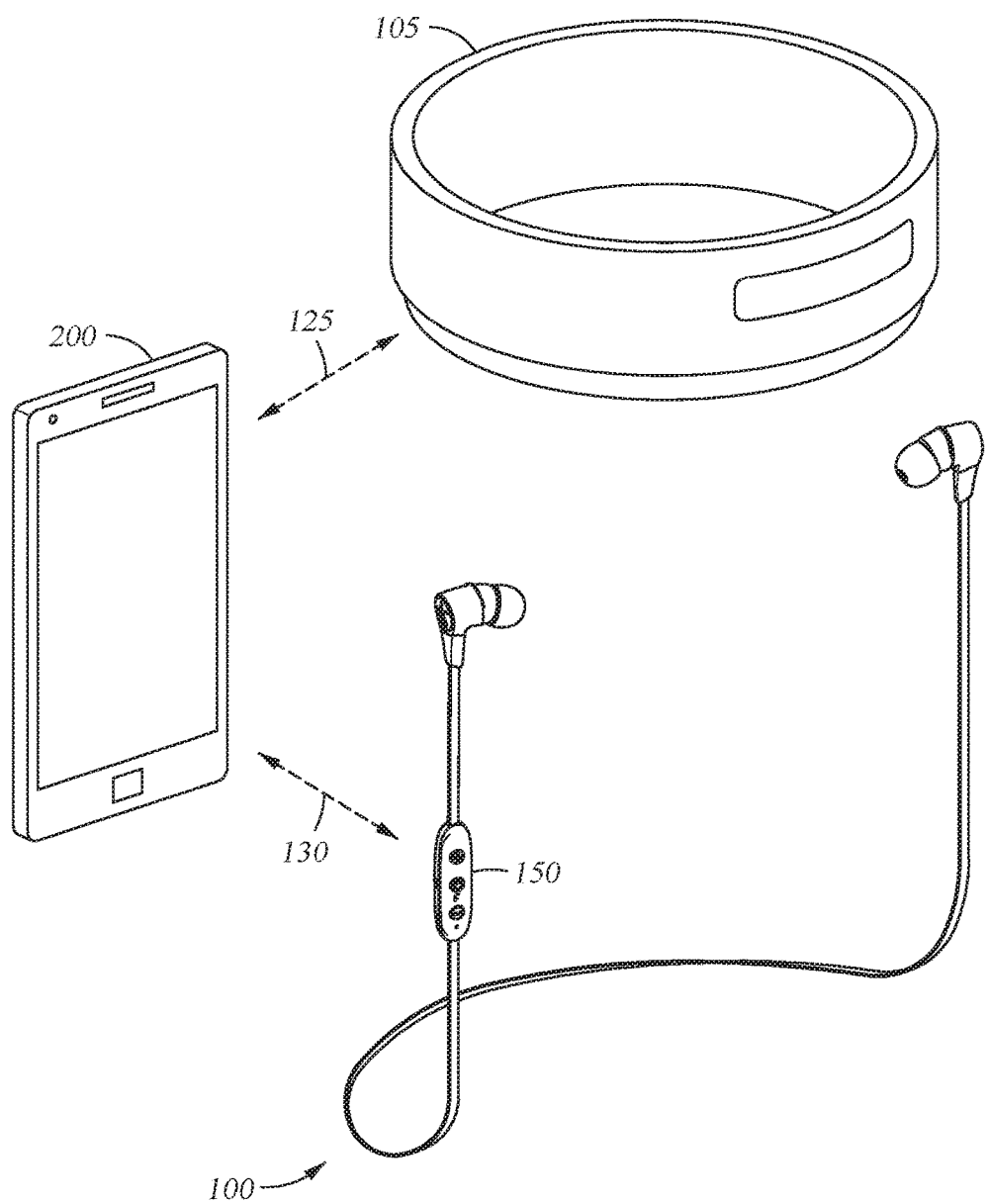
FIG. 1 illustrates an example of a communication configuration or environment in which embodiments of the disclosed technology may be implemented.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring one or more of embodiments of the disclosure provided herein.

The technology disclosed herein is directed toward an antenna integrated into a wearable device. Embodiments of the disclosure provided herein generally include a method and/or an apparatus that includes a wearable electronic device that has an internal antenna that is configured to wirelessly communicate with other electronic devices. In addition to wirelessly receiving high-fidelity audio data for playback, the disclosed earphones may collect the user's biometric data such as heart rate data and movement data, and wirelessly transmit the biometric data to a computing device for processing and user-interaction using an activity tracking application installed on the computing device. In one embodiment of the disclosure, in which the wearable device is a wearable fitness-monitoring device, being sleek, mobile, lightweight, and/or rugged allows a user to perform numerous activities while wearing the device. Moreover, the antenna designed disclosed herein enable the transmission and collection of data, such as data relating to the user's activity and the user's physical responses thereto, via a wireless communication technique, thus enabling the user to better track a multitude of fitness-and-health related data points.

FIG. 1 illustrates an example of a communication environment in which embodiments of the disclosed technology may be implemented. In this environment, earphones 100 communicate with computing device 200 using a communication link 130. In some embodiments, the earphones 100 transfer biometric data about a user to the computing device 200 and receive audio data from the computing device 200 via the communication link 130. The biometric data is measured by one or more sensors (e.g., heart rate sensor, accelerometer, gyroscope) found within the earphones 100. Though the communications environment depicts the computing device 200 as a smart phone, computing device 200 may be any computing device (e.g., smart phone, tablet, laptop, smart watch, desktop, etc.) configured to transmit audio data to earphones 100, receive biometric data from earphones 100 (e.g., heart rate and motion data), and process the biometric data collected by earphones 100. In additional embodiments, computing device 200 itself may collect additional biometric information that is provided for display to a user. For example, if computing device 200 is a smart phone, it may use built-in accelerometers, gyroscopes, and a GPS to collect additional biometric data. Also included in the environment of FIG. 1 is a wearable band which communicates via link 125 to the computing device 200. The wearable band is further described in reference to FIG. 12 below.

Computing device 200 additionally includes a graphical user interface (GUI) to perform functions such as accepting user input and displaying processed biometric data to the user. The GUI may be provided by various operating systems known in the art, such as, for example, iOS, Android, Windows Mobile, Windows, Mac OS, Chrome OS, Linux, Unix, a gaming platform OS, etc. The biometric information displayed to the user can include, for example a summary of the user's activities, a summary of the user's fitness levels, activity recommendations for the day, the user's heart rate and heart rate variability (HRV), and other activity related information. User input that can be accepted on the GUI can include inputs for interacting with an activity tracking application further described below.

In preferred embodiments, the communication link 125, 130 is a wireless communication link based on one or more wireless communication protocols such as Bluetooth®, Zig-Bee®, 802.11 protocols, Infrared (IR), Radio Frequency (RF), etc. Alternatively, the communications link 130 may be a wired link that may use any combination of an audio cable, a USB cable or the like.

Figure 2:
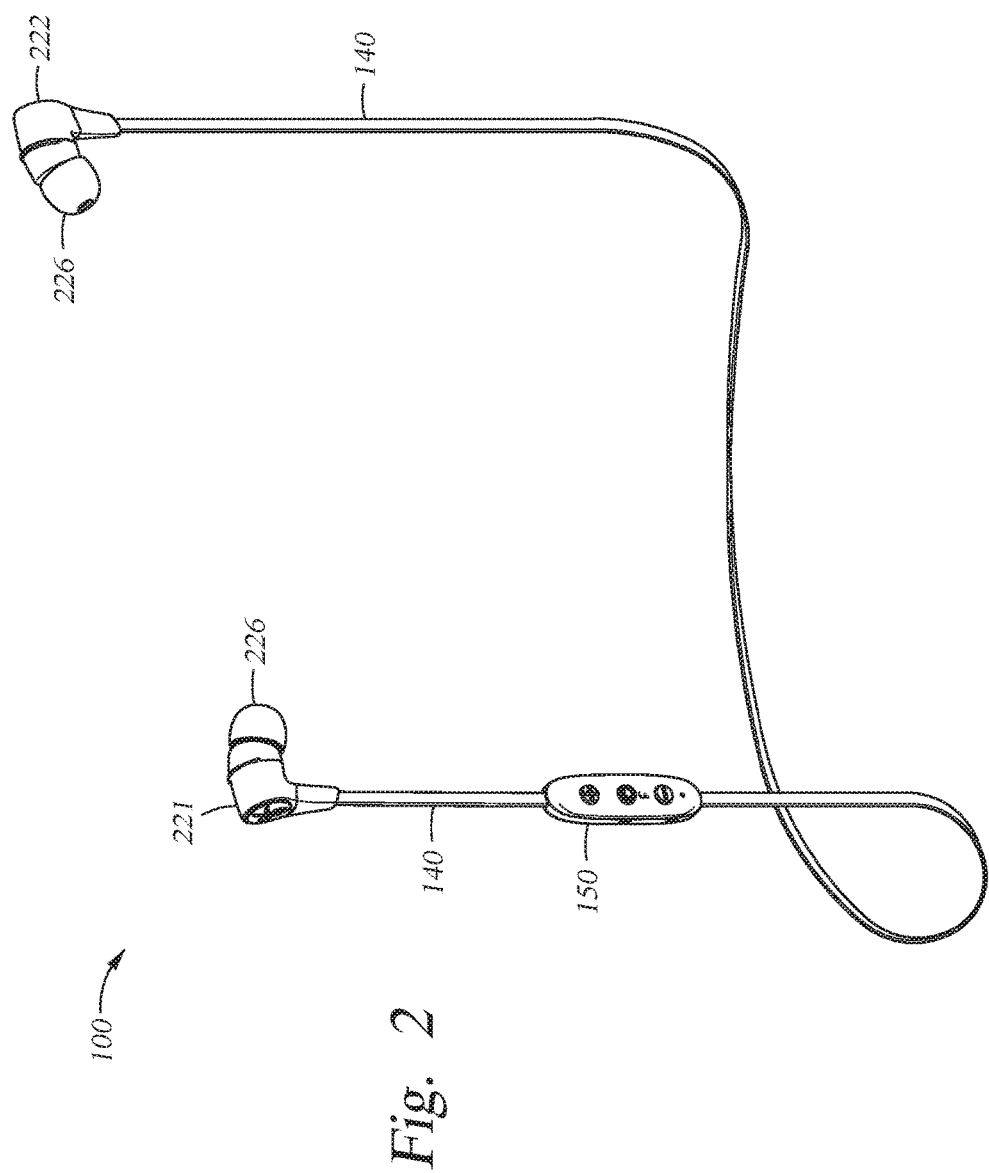
FIG. 2 illustrates a perspective view of earphones according to embodiments of the present disclosure.

With specific reference now to earphones 100, FIG. 2 illustrates a perspective view of example earphones according to embodiments of the present disclosure. Earphones 100 include a right earphone 222 with tip 226, a left earphone 221 with tip 226, a controller 150 and a cable 140. A first portion of cable 140 electrically couples the right earphone 222 to the controller 150 and a second portion of cable 140 couples the left earphone 221 to the controller 150.

In some embodiments, earphones 100 may be constructed with different dimensions, including different diameters, widths, and thicknesses, in order to accommodate different human ear sizes and different preferences. In some embodiments of earphones 100, the earphone housing of each earphone 221, 222 include a rigid shell that surrounds electronic components. The rigid shell may be made with plastic, metal, rubber, or other materials known in the art. The earphone housing may be cubic shaped, prism shaped, tubular shaped, or cylindrical shaped. Each earphone housing may be connected to an end of the cable 140 to provide a structural connection between the earphones and the controller 150.

The tips 226 for the earphones may be shaped to be rounded, parabolic, and/or semi-spherical, such that each comfortably and securely fits within a wearer's outer ear, with the distal end of the tip contacting an outer rim of the wearer's outer ear canal. In some embodiments, the tip may be removable such that it may be exchanged with alternate tips of varying dimensions, colors, or designs to accommodate a wearer's preference and/or fit more closely to match the radial profile of the wearer's outer ear canal. The tip may be made with softer materials such as rubber, silicone, fabric, or other materials, as would be appreciated by one of ordinary skill in the art.

In some embodiments, earphone controller 150 may provide various controls (e.g., buttons and switches) related to audio playback, such as, for example, volume adjustment, track skipping, audio track pausing, and the like. Additionally, earphone controller 150 may include various controls related to biometric data gathering, such as, for example, controls for enabling or disabling heart rate and motion detection. In a particular embodiment, controller 150 may be a three-button controller.

Figure 3:
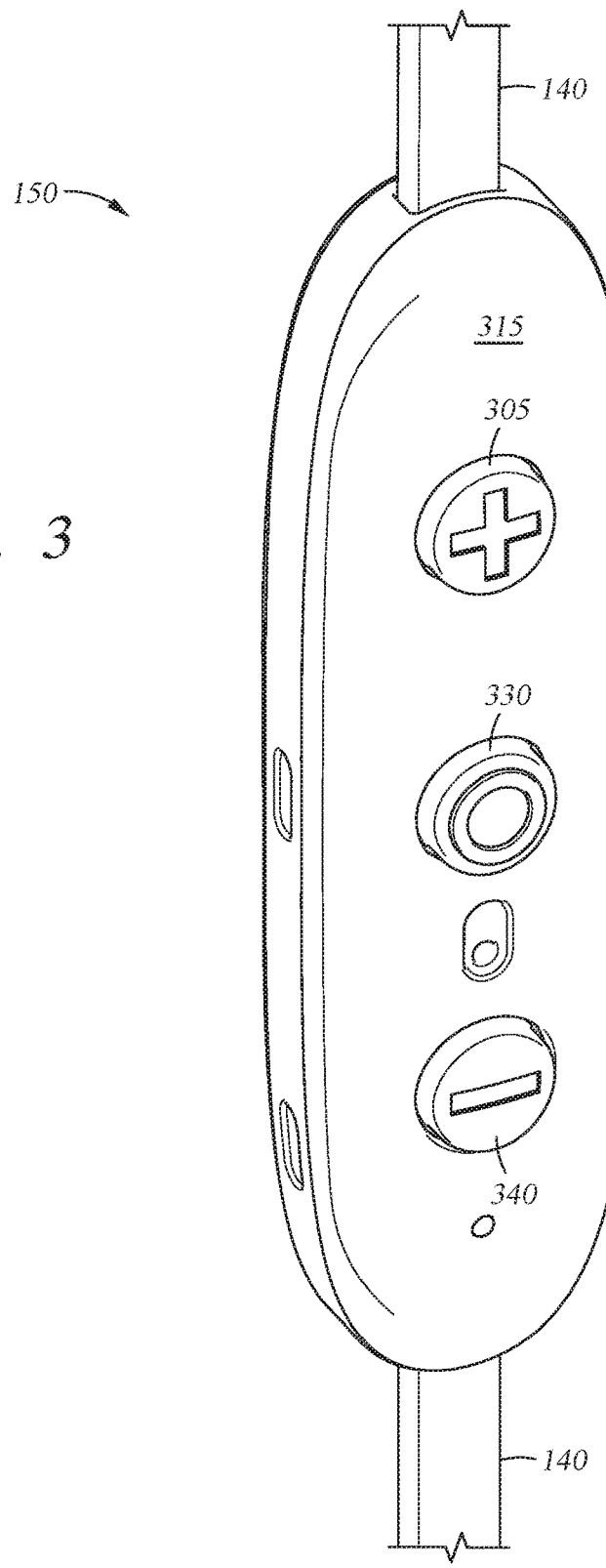
FIG. 3 illustrates a perspective view of an earphone controller according to embodiments of the present disclosure.

FIG. 3 illustrates a perspective view of an example earphone controller 150. As illustrated in FIG. 2, a controller 150 is connected to each earphone 221, 222 via the first or second portion of the cable 140. The controller 150 may include various control buttons 305, 330, 340 to control or adjust various functions of the earphones. By way of example only, control button 305 may increase the audio volume and control button 340 may decrease the audio volume emitted by the earphones 100. By way of another example only, control button 330 may play/pause the audio by clicking or tapping the button once or even fast-forward a song when the control button 330 is tapped twice quickly. However, it should be noted that the control buttons 305, 330, 340 are not merely limited to increasing volume or pausing/fast forwarding audio. Instead, control buttons 305, 330, 340 may provide a variety of control functions (e.g., receive incoming call, ignore incoming call, capture a photo, record biometric data, enable or disable heart rate and motion detection, etc.) depending on the type of computing device to which the earphone is configured to communicate biometric and/or audio data over communication link 130. Furthermore, controller 150 is not limited to a three-button controller, and instead, may include one button, two buttons, four buttons, etc.

Figure 4:
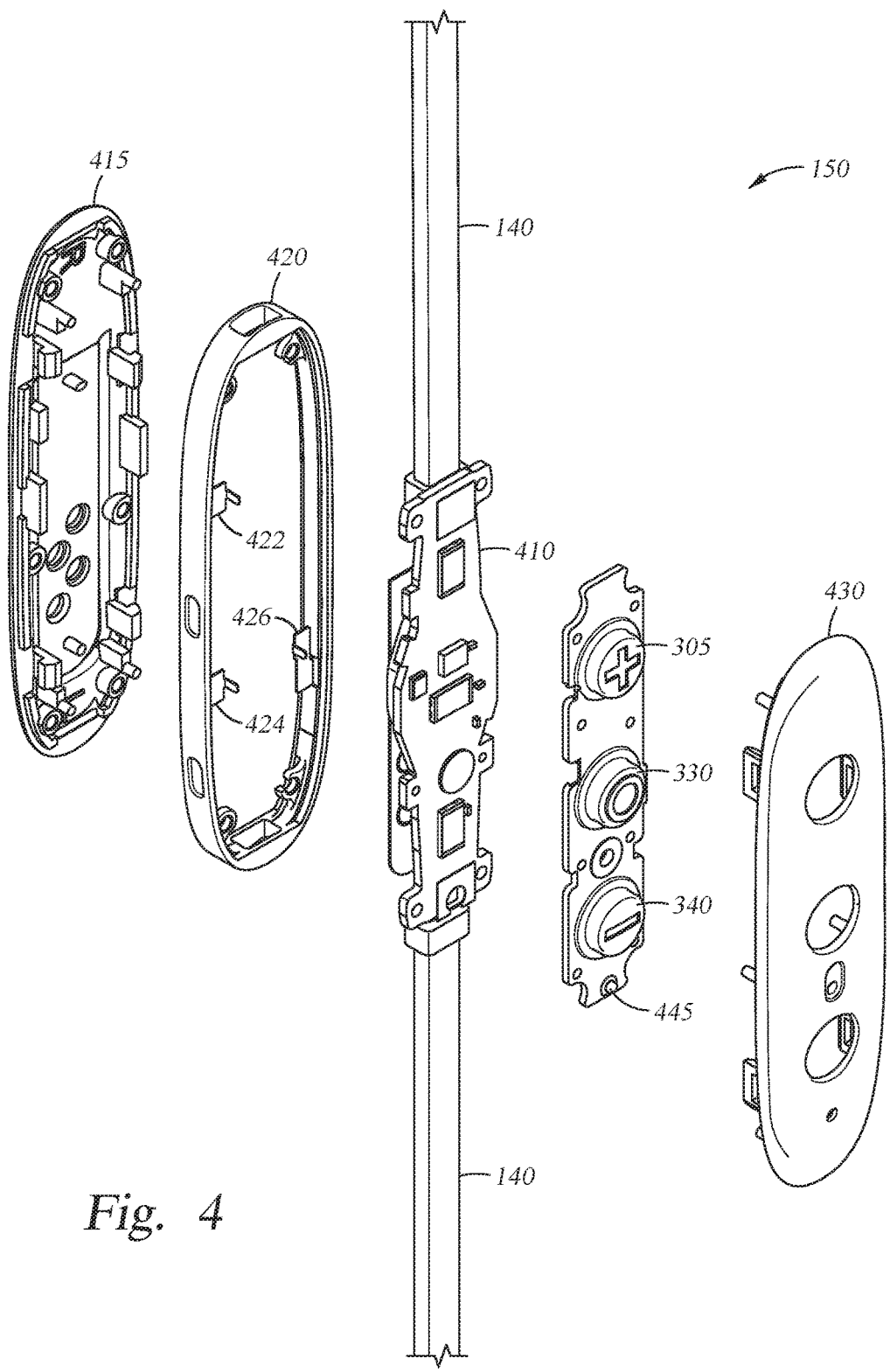
FIG. 4 illustrates a perspective, exploded view of an earphone controller assembly according to embodiments of the present disclosure.

FIG. 4 illustrates a perspective, exploded view of an example of the earphone controller 150 that is an assembly that contains multiple electrical and structural components, which will be discussed in greater detail below. The assembly includes a front cover 430, a back cover 415, a carrier board 445 for a set of control buttons 305, 330, 340, at least one printed circuit board 410 to which cable 140 is coupled, and an antenna 420. In one embodiment, the printed circuit board 410 is a multi-layer circuit board that includes a ground plane, and may have mounted thereon one or more electrical or electronic components or modules, such as processors, logic circuits, batteries, modems, amplifiers, wireless transceivers (e.g., GPS, Wi-Fi, Bluetooth, cellular, etc.), and the like.

Figure 5:
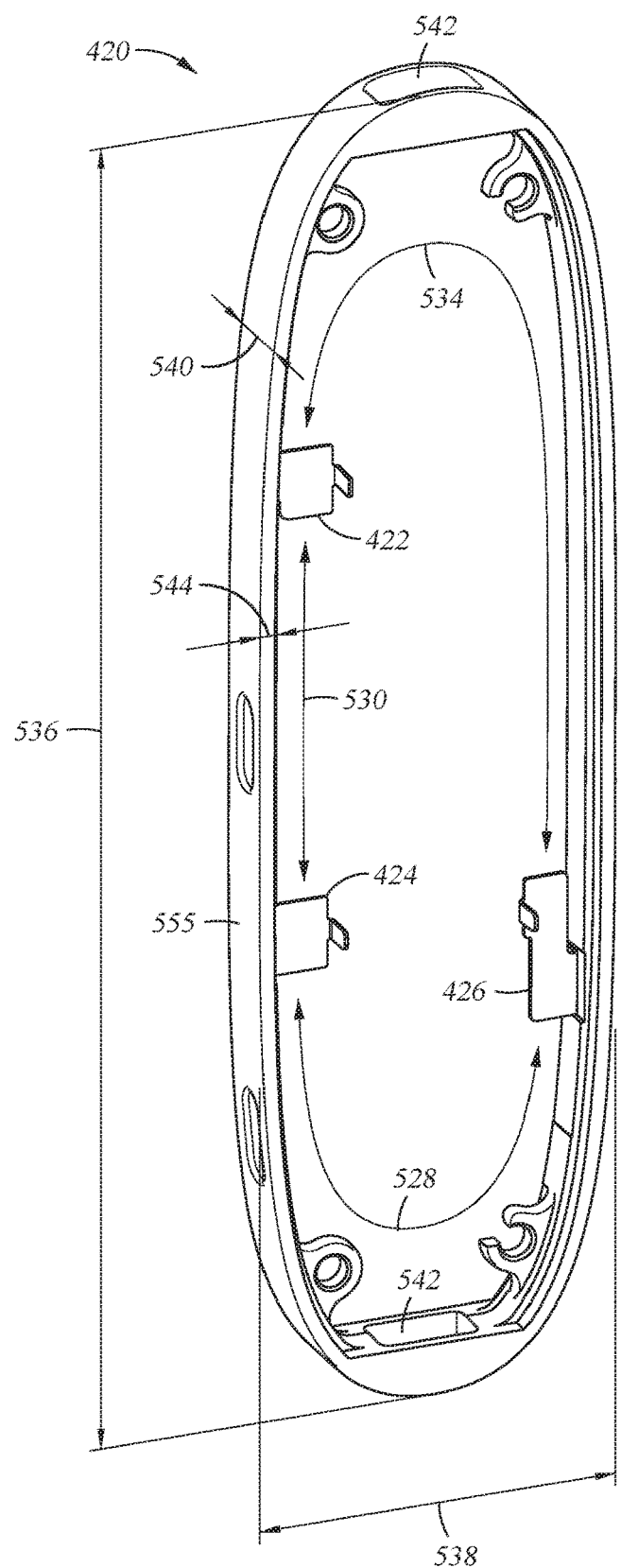
FIG. 5 depicts a perspective view of an antenna used in the earphone controller assembly, according to embodiments of the present disclosure.

FIG. 5 depicts a perspective view of the antenna 420 found within the earphone controller 150, according to embodiments of the present disclosure. The antenna 420 may be configured as an electrically conductive element. The electrically conductive element 420 may define a perimeter of the controller 150, or band 105 and has sufficient mechanical strength so as to be part of the earphone controller housing.

In one embodiment, the antenna 420 has a loop or oval shape with three connection points 422, 424, and 426 and two cable apertures 542 that are formed in the rim 540 of the antenna 420. When one of the connection points 422 is connected to a wireless transceiver 1080 (FIG. 10) and the other two connection points 424, 426 are connected to ground, the antenna can be viewed as an inverted-F antenna, which has a ground plane, a first pole and a second pole. In the inverted-F antenna configuration, the ground plane includes the ground plane 610 (FIGS. 6 and 7) of the printed circuit board 410, and in some embodiments can also include the electrical shielding portions of the cable 140. The electrical shielding portions of the cable 140 are electrically connected to the ground plane 610. The first pole 534 of the inverted-F antenna is formed from a portion of the antenna 420 that extends the longer distance from the driven connection point 422 to a ground connection point 426. The second pole 530, which is grounded at one end to the ground plane 610, is formed from a portion of the antenna 420 that extends the shorter distance from the driven connection point 422 to the grounded connection point 424. An additional element, or a parasitic element 528, is formed between the first grounded connection point 424 and the second grounded connection point 426. By being in proximity with the driven poles 534 530 of the antenna, the parasitic element 528 has an induced current flowing between its two ends. This induced current causes the parasitic element to generate an electromagnetic wave that is in a beneficial phase relationship with the driven poles 534 530, thereby improving the behavior of the antenna. First and second portions of cable 140 are generally positioned so that they protrude through the two cable apertures 542 at each end of the antenna 420 and are discussed below.

The connection points 422, 424, 426, which define the first pole 534 and second pole 530, determine one or more desired antenna operating parameters such as gain, operating frequency, bandwidth, radiation pattern shape, which is generally an omni-directional pattern in the azimuth plane of the antenna. In addition, it is believed that the parasitic element 528 operates in concert with the inverted-F antenna to adjust the directionality of the radiation pattern. In some embodiments, the size of the antenna 420 may be adjusted so that the antenna will operate within a desired frequency range. In some configurations, the frequency of operation of the antenna 420 may be limited to a fixed range of frequencies, such as from 800 MHz to 3.25 GHz. In one embodiment, the communicative coupling between the antenna 420 and another electronic device occurs in accordance with the Bluetooth™ standard, which is a low energy (i.e., Class 2) protocol, which in the U.S. transmits and receives in a frequency range from 2.400 GHz to 2.4835 GHz. In some embodiments, the communicative coupling between the antenna 420 and another electronic device occurs in accordance with the Bluetooth™ standard which is used in Europe and/or other countries around the world.

In one embodiment, the antenna 420 has an approximate length 536 that is between about 30 mm and about 55 mm, such as about 40 mm, an approximate width 538 of between about 8 mm and about 30 mm, such as 12 mm, and an overall perimeter of between about 76 mm and about 170 mm, such as about 95 mm. In one embodiment, the first pole 534 has a length of between about 20 mm and 34 mm, such as about 30 mm, the second pole 530 has a length of between about 5 mm and 15 mm, such as about 10 mm and the parasitic portion 528 has a length less than about 30 mm. In embodiment, the ratio of the first pole length to the second pole length may be about 3:1, while the ratio of the parasitic portion length to the first pole length is about 1:1.3. In general the first pole length, the second pole length and the parasitic portion length are each defined by the length of the translated path of the centroid of the cross-section of the closed loop antenna extending between the relevant connection points, or in some cases the average length in the perimeter of the exterior surface of the closed loop antenna extending between the relevant connection points (e.g., (inner perimeter length+outer perimeter length)/2). In one example, the first pole length, the second pole length and the parasitic portion length are each formed so that their lengths are simple fractions of a wavelength (e.g., $\lambda/2$, $\lambda/3$, $\lambda/4$, $\lambda/6$, $\lambda/8$, etc.) that is to be transmitted and/or received by the antenna 420. In one example, when the antenna operates at about 2.44 GHz, the wavelength is about 125 mm, and the length of the first pole is about ⅓ of a wavelength. In this example, the length of the second pole may be about ⅛ of a wavelength and the parasitic element is less than ⅓ of a wavelength when measure in air. It is believed that the effective wavelength of the antenna will depend on the type and amount of material that surrounds or covers the actual antenna, and thus it will matter if the effective wavelength(s) are determined in air (i.e., not interference) versus if the antenna is covered or embedded in a dielectric, such as plastic.

In some embodiments, the rim 540 of the antenna 420 may have a length of between about 0.5 mm and about 10 mm, such as about 3 mm, and an average thickness 544 of the material from which the antenna is formed of between about 0.1 mm and about 5 mm, such as about 1 mm.

In an alternate embodiment, the antenna 420 and the connection points 422, 424, and 426 are configured to form a slotted antenna. In one configuration, the slotted antenna includes a main slot 951 (FIG. 9) that is formed within the internal region of the antenna 420 and is defined by a space formed between the inner surface of the antenna 420, an outer edge of the ground plane 610 and the adjacent edges of the connection points 424 and 426, and a tuning slot 952 (FIG. 9) that is formed within the internal region of the antenna 420 and is defined by a space formed between the inner surface of the antenna 420, the outer edge of the ground plane 610 and the adjacent edges of the connection points 422 and 424. In the slotted antenna configuration, the ground plane 610 is disposed within the internal region of the antenna 420, which is circumscribed by and thus defined by inner surface of the antenna 420. Electrically, in this configuration, the antenna 420 and connection points 422, 424, and 426 are all electrically connected together to form the antenna that is driven by the transceiver 1080. In some embodiments, a third slot 953 is formed within the internal region of the antenna 420 and is defined by a space formed between the inner surface of the antenna 420, an outer edge of the ground plane 610 and the adjacent edges of the connection points 422 and 426. The distance between the connection points 422 and 424 of the tuning slot 952 can be adjusted to balance the impedance and tune the efficiency of the radiation emitted at a desired frequency by the antenna 420. Additionally, the distance between the connection points 424 and 426 of the main slot 952 and/or the distance between the connection points 422 and 426 of the third slot 953 can be adjusted to at least tune the efficiency of the radiation emitted by the antenna 420.

The antenna 420 may be formed from a conductive and structurally durable material, such as metal. Metals such as stainless steel, aluminum, copper, nickel, tin, plain steel or other metals, or combinations thereof, may be used if desired. In another embodiment, the antenna 420 may be formed from a non-conductive material, which may include a plastic, glass, ceramic composites, or other suitable material, that also includes a conductive coating or conductive particles embedded therein. The conductive coating and/or particles may include, for example, an electrically conductive layer that includes copper (Cu), nickel (Ni), chrome (Cr), silver (Ag), tin (Sn) or combinations thereof. In some embodiments, the surface 555 of the antenna 420 may further include a dielectric coating, such as a polymeric coating (e.g., epoxy, nylon, PTFE, polyester), or dielectric layer, such as an anodized layer, that is disposed over the exposed surface(s) of the antenna so as to electrically isolate the active surface(s) of the antenna from the user during normal handling and use.

Figure 6:
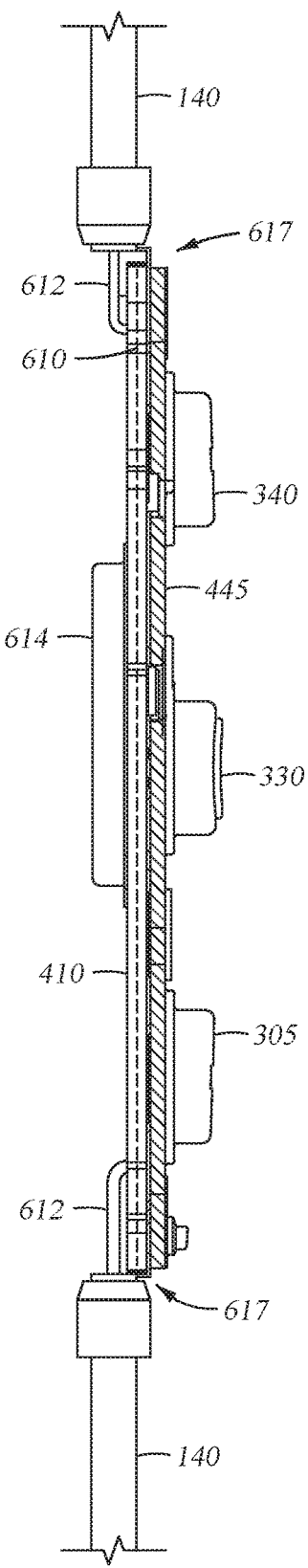
FIG. 6 depicts a side view of various internal components disposed within the earphone controller, according to embodiments of the present disclosure.

FIG. 6 depicts a side view of the printed circuit board 410 and carrier board 445, which includes the control buttons 305, 330, 340, that are all disposed within the earphone controller 150, according to embodiments of the present disclosure. The printed circuit board 410 includes a ground plane 610, which is one of many layers of the printed circuit board 410 and may be connected to other layers formed within the printed circuit board 410. Conductors 612 in each portion of the cable 140 are connected to the printed circuit board 410 while the shields 617 of each portion are connected to the ground plane 610 of the printed circuit board 410. The cable shields 617, which surround the conductors 612 (e.g., electrically insolated wires), within each portion the cable 140 serve not only to electromagnetically shield the conductors but also to electrically extend the ground plane of the antenna beyond the ground plane 610 in the printed circuit board 410. It is believed that this has a significant effect on the ability of the antenna 420 to transmit RF signals to and receive RF signals from an external device by increasing the antenna efficiency from 30% to 60%, or a factor of two improvement.

As shown in FIG. 6, the printed circuit board 410 has mounted thereon a metal cover 614 that is configured to shield sensitive circuitry mounted on the printed circuit board 410. The metal cover 614 is made of highly-permeable metal, such as iron. This cover 614 is also connected to the ground plane 610. As configured, the metal cover 614 shields the sensitive circuitry located under the cover from the electric and magnetic fields generated by the antenna 420.

Figure 7:
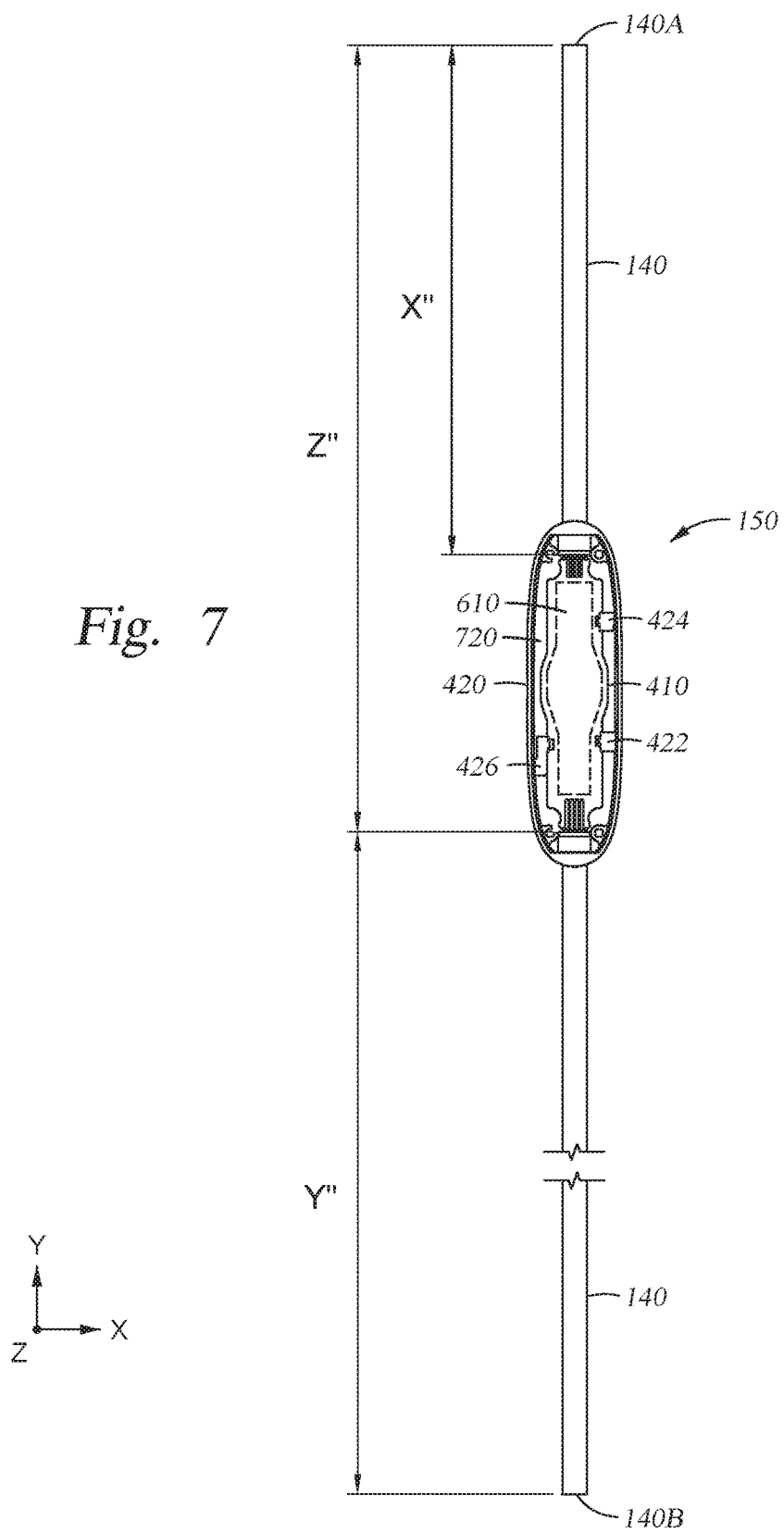
FIG. 7 depicts the cable and a portion of the earphone controller assembly, according to embodiments of the present disclosure.

FIG. 7 depicts the cable 140, the PCB 410 with a ground plane 610 therein and the antenna 420, according to embodiments of the present disclosure. As shown, each portion of the cable 140 protrudes through an aperture 542 (FIG. 5) formed in the rim 540 of the antenna 420 so that the conductors of each portion can be terminated on the PCB 410 and the shields 617 (FIG. 6) of each portion of the cable can be terminated on the connection regions 910 (FIG. 9) that are connected to the ground plane 610 of the PCB 410. The shield 617 is generally the electrically conductive shielding portion of the cable 140, which is intended to improve the signal-to-noise ratio of the data transferred through one or more of the cable conductors 612 that are separate from the shield 617. In one embodiment, the length X" of one portion of the cable 140 and its shield on one side of the earphone controller 150 is shorter than the length Y" of the other portion of the cable 140 and its shield on the opposite side of the earphone controller 150. The respective ends 140A and 140B, which define the ends of the length X" and length Y", respectively, are where the shield 617 is terminated on a conductive frame element, ground referenced portion of a driver or similar component found in the respective earphone 221, 222. It is believed that controlling the length of length X" (i.e., shorter length) of the shield 617 is most effective at improving antenna efficiency. In one embodiment, the length X" of the shield 617 is adjusted to be ½ wavelength so that the voltage at the end of the portion of the cable 140 near the connection to the earphone 221 is zero. In one embodiment, a length Z", which is defined by the length X" plus the linear length of the ground plane 610 up to the connection point of the shield used to define the length Y" is equal to about one wavelength ($\lambda$) of the driven frequency. In one configuration, the linear length of the ground plane 610 is defined by a distance that is measured between a connection point of the shield 617 at a first point on the PCB 410 (e.g., connection point on the connection region 910 of the X" portion of cable (FIG. 9)) to a connection point of the shield 617 at a second point on the PCB 410 (e.g., connection point on the connection region 910 of the Y" portion). In one configuration, the length X" plus the linear length of the ground plane 610 up to the connection point of the shield can be measured along a first direction, such as a direction that is parallel to the Y-direction shown in FIG. 7.

Also depicted in FIG. 7 is a variable sized gap 720 that is formed between the antenna 420 and an edge of the ground plane 610 of the PCB 410. The variable sized gap 720 can be filled with either a dielectric material, air or combination of both, and may vary in size about the inner perimeter that follows the inner surface of the antenna 420. The gap 720 is generally defined as a space that is formed between a point on the inner surface of the antenna 420 and the closest distance to the outer edge of the ground plane 610. The outer edge of the ground plane 610 is illustrated by the dashed line in the PCB 410 in FIGS. 7-9. In some embodiments, the gap 720 is configured so that hot points, such as the quarter-wavelength point 801 (FIG. 8) at which a standing wave is formed in the antenna at the operating radio frequency, occur at sites where the gap 720 is designed to be a desired size, which is shown as a feature gap 720A in FIG. 8. In some embodiments, the feature gap 720A is formed around each of the hot points formed on the antenna 420, which are selected to match a known antenna drive frequency (e.g., 2.44 GHz). The feature gap 720A can be defined so that it has at least a minimum spatial distance, since it is believed that maintaining a feature gap 720A of at least a certain size in a region 720B (FIG. 8) around the hot points has a beneficial effect on antenna performance. Thus, for a given connection point 422, 424, and 426, configuration of the antenna 420 and operating radio frequency, the shape of the ground plane 610 and the PCB 410 is adjusted to provide a gap that has at least a desired size around the hot points, such as hot points that are found at simple fractions of a wavelength of the driven RF signal (e.g., $\lambda/4$, $\lambda\lambda/4$, $5\lambda/4$, etc.). In some configurations, a smaller gap size may be provided at points where a non-hot point (e.g., node) is formed along the length of the antenna at the operating radio frequency (e.g., $\lambda/2$, $\lambda$, etc.) so that the PCB 410 can be physically attached to the antenna 420 at or near these points. In one embodiment, the variable gap has a maximum size of between about 1.5 mm and about 8 mm, such as between about 0.5 mm and 5 mm, such as about 3 mm, and a minimum size of between about 0.1 mm and about 5 mm when the antenna is being used within the 800 MHz to 3.25 GHz range, such as between the 2.400 GHz to 2.4835 GHz range. In one embodiment, the feature gap 720A has a gap size of between about 0.5 mm and about 8 mm, such as between about 2 and 5 mm, or even at least 2 mm, or even at least 3 mm at the hot points formed on the antenna. The shape of the edges of the ground plane 610, as viewed normal to a plane passing through the antenna (e.g., X-Y coordinate plane shown in FIG. 7) is thus controlled by the shape of the antenna 420 and not the shape of the PCB.

Figure 8:
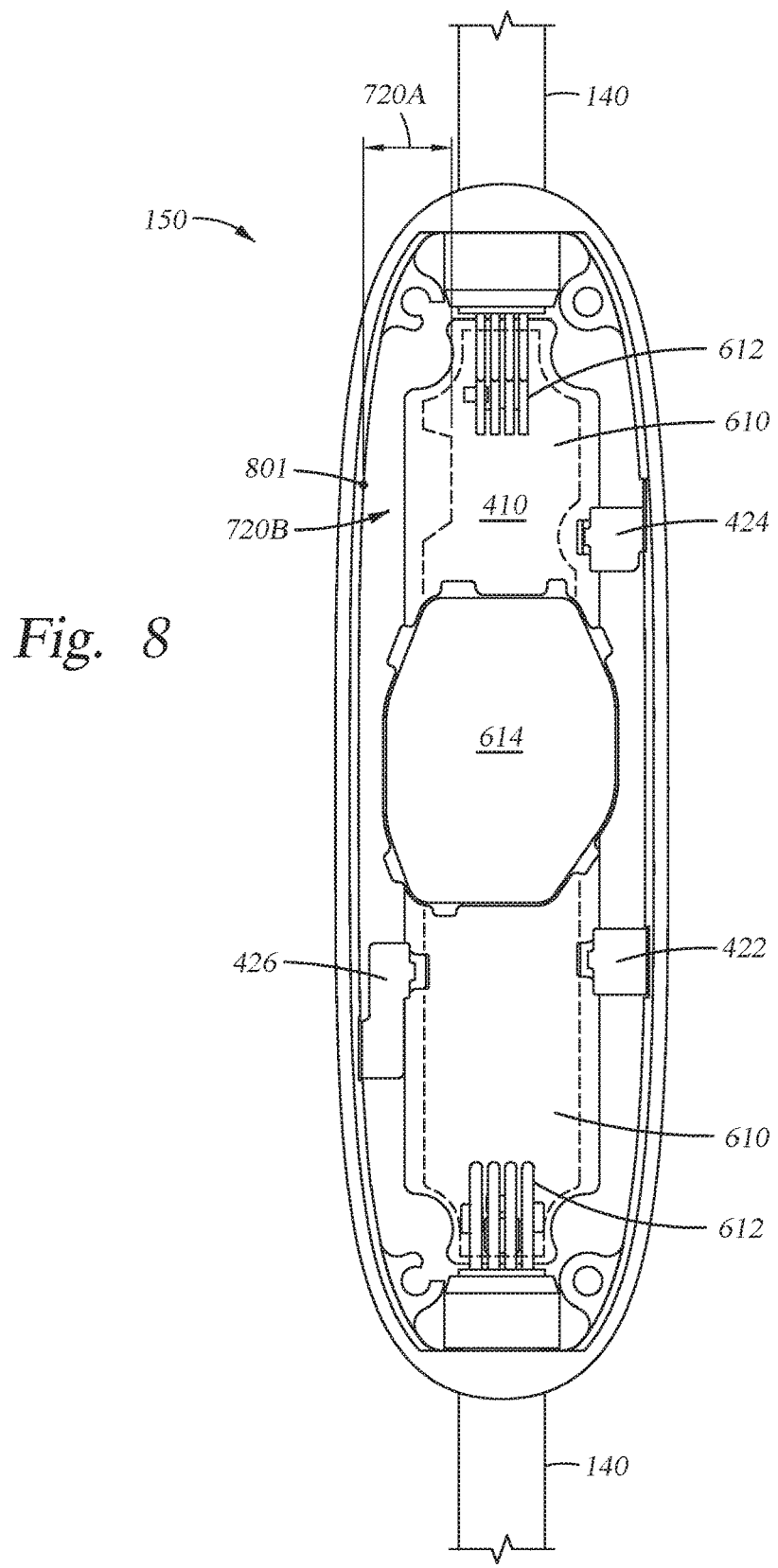
FIG. 8 depicts a plan view of the antenna and other components contained within the earphone controller assembly, according to embodiments of the present disclosure.

FIG. 8 depicts a top plan view of the antenna, printed circuit board 410 and cable 140, according to embodiments of the present disclosure. In this view of the earphone controller 150, the connection points 422, 424, and 426 of the antenna 420 and the connections of the cable conductors 612 to the printed circuit board 410 are visible. In the case where the antenna is fabricated with stainless steel and the connection points 422, 424 and 426 are made from copper so that connections to the printed circuit board 410 can be easily made by a soldering process, and the opposing ends of the connection points 422, 424 and 426 can be easily e-beam or laser beam welded to the stainless steel antenna 420.

Figure 9:
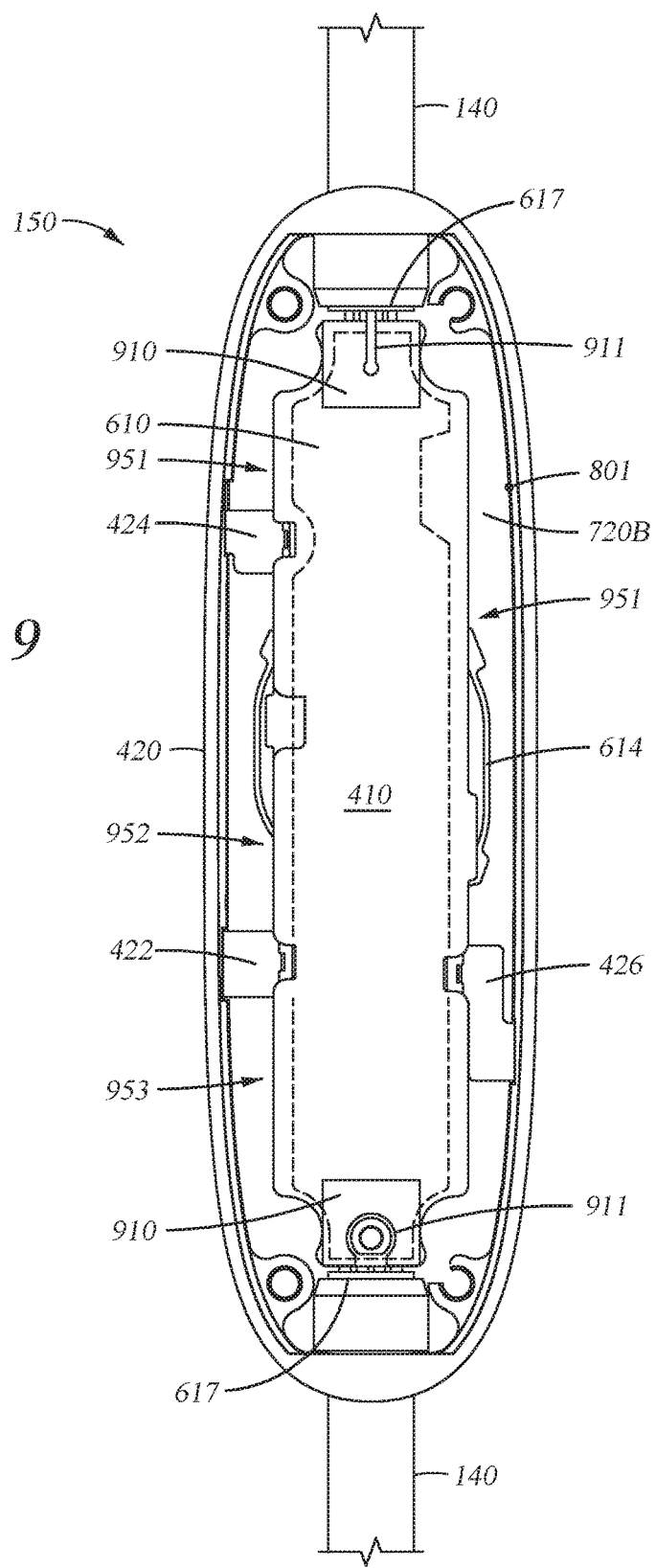
FIG. 9 depicts a bottom plan view of the antenna, the cable and the printed circuit board, according to embodiments of the present disclosure.

FIG. 9 depicts a bottom view of the antenna 420, the cable 140 and the printed circuit board 410 with the carrier board 445 removed from the earphone controller 150 for clarity reasons, according to embodiments of the present disclosure. In this view, the connections of the antenna 420 to the printed circuit board 410 are visible as well as the connection regions 910 of the printed circuit board 410 that are connected, by use of the connection components 911, to the cable shields 617. The cable shields 617 generally surround and extend along the length of the multiple conductors 612, which electrically connect the components on the printed circuit board 410 with the various electrical components (e.g., sensors, drivers) found within the earphones 221, 222.

Figure 10:
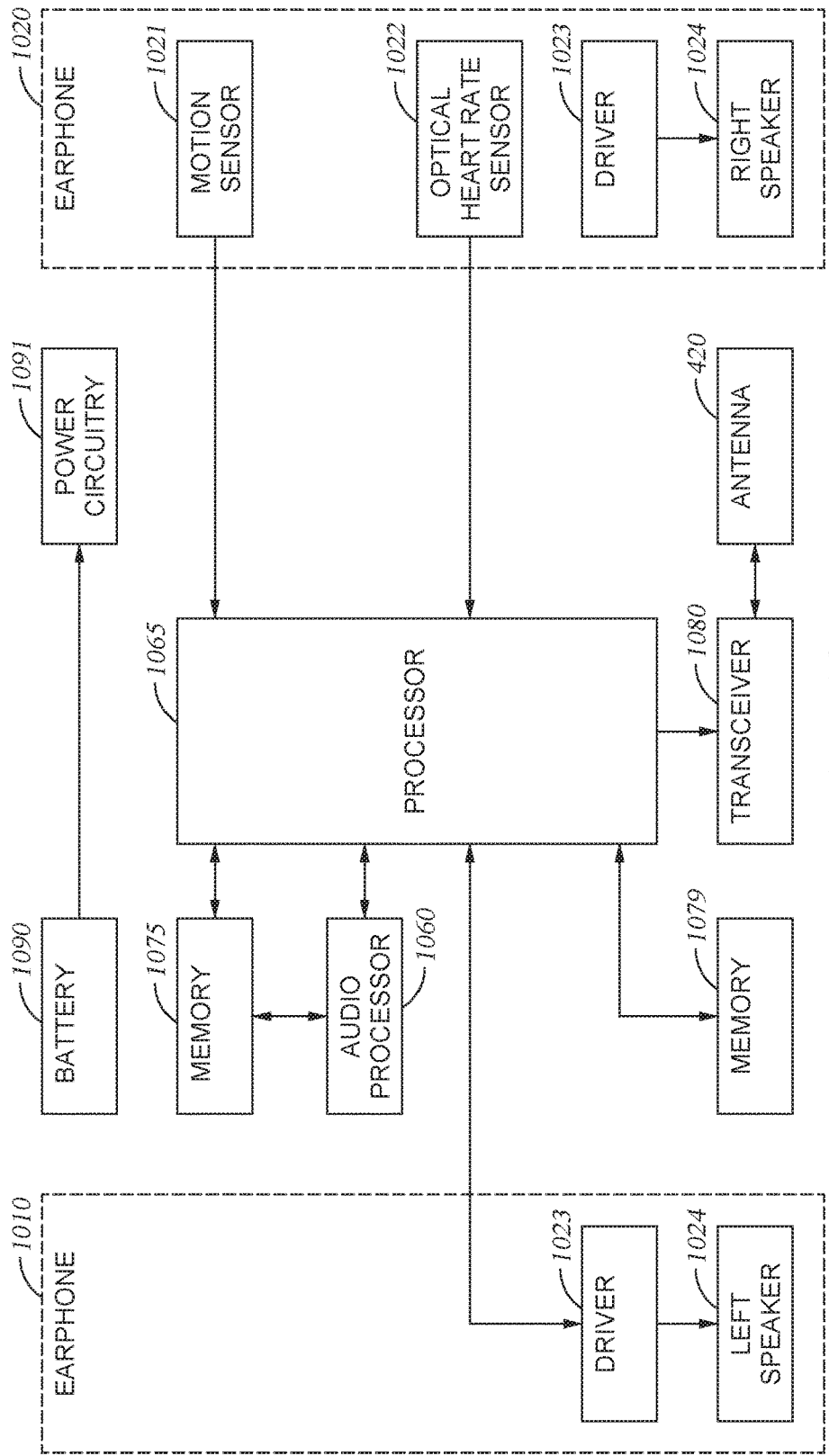
FIG. 10 illustrates a schematic view of circuitry of earphones according to embodiments of the present disclosure.

FIG. 10 illustrates an example of the architecture of the circuitry of the earphones 100 according to embodiments of the present disclosure. Each earphone itself can include electronic circuitry, as shown, to carry out operations supporting the earphone. The circuitry of earphones 100 includes processor 1065, memory 1075, wireless transceiver 1080, circuitry for earphone 1010 and earphone 1020, and a battery 1090. The earphone 1010 and earphone 1020 may be the earphones 221, 222, respectively, which are discussed above. In one embodiment, earphone 1020 includes a motion sensor 1021 (e.g., an accelerometer or gyroscope), an optical heart rate sensor 1022, and a right speaker 1024 and corresponding driver 1023. Earphone 110 includes a left speaker 1024 and corresponding driver 1023. In additional embodiments, earphone 1010 may also include a motion sensor such as an accelerometer or gyroscope.

The processor 1065 comprises logical circuits dedicated to receiving, processing, and storing biometric information collected by the biometric sensors (e.g., motion sensor 1021, an optical heart rate sensor 1022) of the earphones as well as operating the transceiver 1080 for the antenna 420.

More particularly, processor 1065 is electrically coupled to motion sensor 1021 and optical heart rate sensor 1022, and receives and processes electrical signals generated by these sensors. These processed electrical signals represent biometric information such as the earphone wearer's motion and heart rate. Processor 1065 may store the processed signals as biometric data in memory 1075, which may be subsequently made available to a computing device using wireless transceiver 1080. In some embodiments, sufficient additional memory, such as memory 1079, is provided to store biometric data for transmission to a computing device for further processing.

During operation, optical heart rate sensor 1022 uses a photoplethysmogram (PPG) to optically obtain the user's heart rate. In one embodiment, optical heart rate sensor 1022 includes a pulse oximeter that detects blood oxygenation level changes as changes in coloration at the surface of a user's skin. More particularly, heart rate sensor 1022 illuminates the skin of the user's ear with a light-emitting diode (LED). The light penetrates through the epidermal layers of the skin to underlying blood vessels. A portion of the light is absorbed and a portion is reflected back. The light reflected back through the skin of the user's ear is then obtained with a receiver (e.g., a photodiode) and used to determine changes in the user's blood oxygen saturation (SpO2) and pulse rate, thereby permitting calculation of the user's heart rate using algorithms known in the art (e.g., using processor 1065). In this embodiment, the optical sensor 1022 may be positioned on one of the earphones to face radially inward towards an earlobe when the earphones are worn by a human user.

In various embodiments, optical heart rate sensor 1022 may also be used to estimate a heart rate variable (HRV), i.e., the variation in time interval between consecutive heartbeats, of the user of earphones 1020. For example, processor 1065 may calculate the HRV using the data collected by sensor 1022 based on a time domain methods, frequency domain methods, and other methods known in the art that calculate HRV based on data such as the mean heart rate, the change in pulse rate over a time interval, and other data used in the art to estimate HRV. In further embodiments, the processor 1065 may further detect, calculate, and store metrics such as the amount of physical activity, sleep, or rest over a period of time, or the amount of time without physical activity over a period of time. The processor 1065 may use the HRV, the metrics, or some combination thereof to calculate a recovery score. In various embodiments, the recovery score may indicate the user's physical condition and aptitude for further physical activity for the current day. For example, the processor may detect the amount of physical activity and the amount of sleep a user experienced over the last 48 hours, combine those metrics with the user's HRV, and calculate a recovery score. In various embodiments, the calculated recovery score may be based on any scale or range, such as, for example, a range between 1 and 10, a range between 1 and 100, or a range between 0% and 100%.

During audio playback, earphones 100 wirelessly receive audio data from computing device 200 using wireless transceiver 1080. The audio data is processed by an audio processor 1060 to form electrical signals that are delivered to respective drivers 1023 of the left speaker 1214 and the right speaker 1224 of earphones 1010 and 1020. The electrical signals are then converted to sound using the drivers. Any driver technologies known in the art or later developed may be used. For example, moving coil drivers, electrostatic drivers, electret drivers, orthodynamic drivers, and other transducer technologies may be used to generate playback sound.

The wireless transceiver 1080 is configured to communicate biometric and audio data using available wireless communications standards. For example, in some embodiments, the wireless transceiver 180 may be a Bluetooth® transmitter, a ZigBee® transmitter, a Wi-Fi transmitter, a GPS transmitter, a cellular transmitter, or some combination thereof. Although FIG. 10 illustrates a single wireless transceiver 1080 for both transmitting biometric data and receiving audio data, in an alternative embodiment, a transmitter dedicated to transmitting only biometric data to a computing device 200 may be used. In this alternative embodiment, the transmitter may be a low energy transmitter such as a near field communications (NFC) transmitter or a Bluetooth® low energy (BTLE) transmitter. In implementations of this particular embodiment, a separate wireless receiver may be provided for receiving high fidelity audio data from an audio source. In yet additional embodiments, a wired interface (e.g., micro-USB) may be used for communicating data stored in memories 1079 and 1075.

FIG. 10 also shows that the electrical components of earphones 100 are powered by a battery 1090 coupled to power circuitry 1091. Any suitable battery or power supply technologies known in the art or later developed may be used. For example, a lithium-ion battery, aluminum-ion battery, piezo or vibration energy harvesters, photovoltaic cells, inductor charger, USB battery charger, or other like devices can be used. In embodiments, battery 1090 may be enclosed in earphone 1010, earphone 1020, or enclosed in the controller 150 connected to each earphone 1010 and 1020 via the cable 140.

The processor 1065 may cooperate with the other components, for example, the antenna 420 and the wireless transceiver 1080 to coordinate and control operations of the earphones 100. Operations may include wirelessly receiving audio data.

Figure 11:
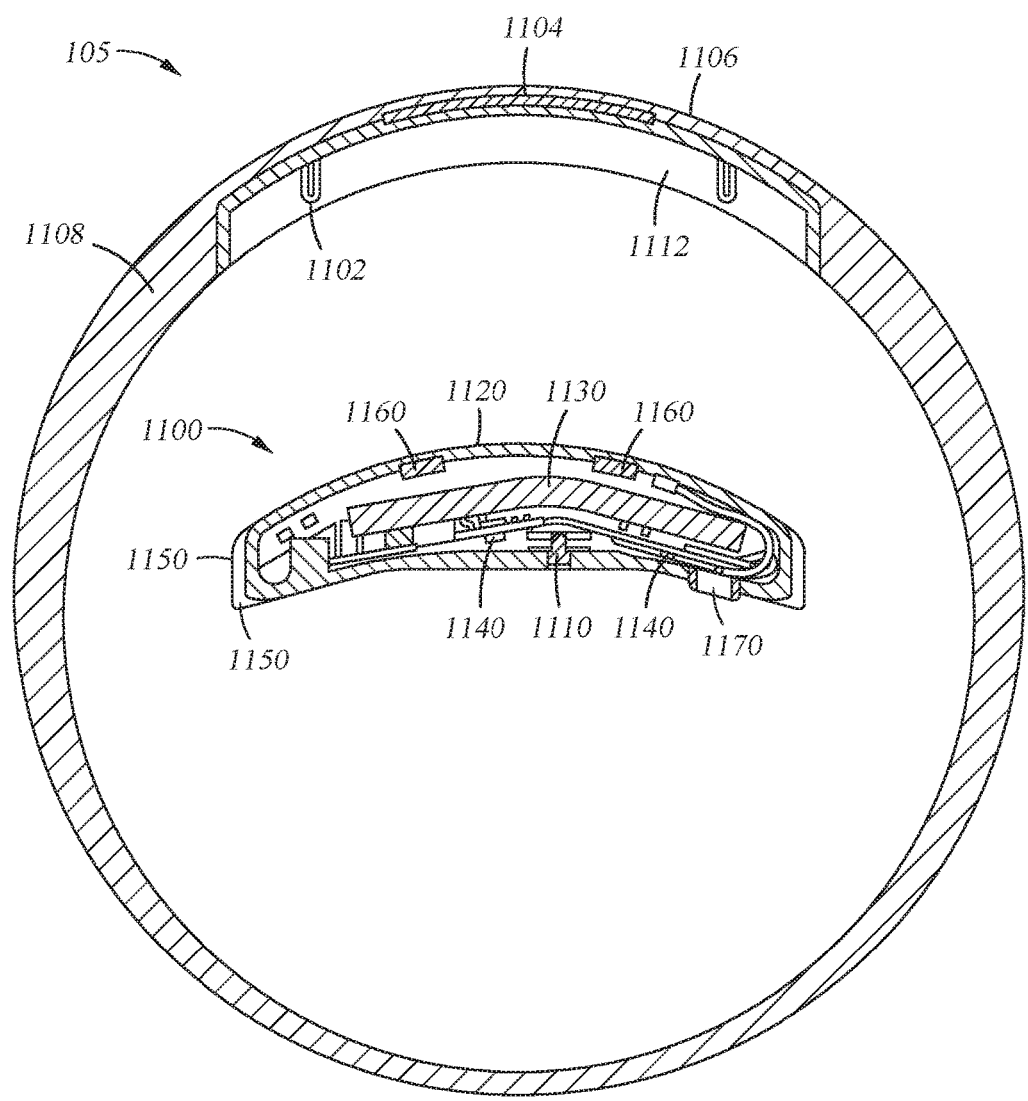
FIG. 11 illustrates a cross-sectional view of a band having an electronic capsule that may be used in connection with the band, in accordance with various embodiments.

Referring back to FIG. 1, the communications environment includes a band 105. FIG. 11 illustrates a cross-sectional view of an example band 105 having an electronic capsule 1150 that may be used in connection with the example band 105, in accordance with various embodiments. Electronic capsule 1150 is a removable/detachable component that may be coupled to and removable/detachable from band portion 105. This may be accomplished in a variety of ways, e.g., magnetic attraction forces, snap-fit/friction, etc. In other cases, electronic capsule 1100 may be integrally formed with band portion 1108.

Electronic capsule 1150 may include various components, such as battery 1130, logic circuits 1140, casing 1150, one or more of a wrist biosensor 1110, a finger biosensor 1120, and/or a motion sensor (e.g., accelerometer, gyroscope, magnetometer, or other inertial measurement unit), and an antenna 1170. Typically, at least one of wrist biosensor 1110 and finger biosensor 1120 is a heart rate sensor configured to detect the heart rate of a wearer of band 105. In the illustrated embodiment, finger biosensor 1120 protrudes outwardly from a first side (i.e., the top) of casing 1150, and wrist biosensor protrudes outwardly from a second side (i.e., the bottom) of casing 1150. As depicted, aperture 1106 of band portion 1108 substantially matches the dimensional profile of finger biosensor 1120, such that finger biosensor 1120 may be exposed and accessible to the touch of a user's finger through aperture 1106 when band 105 is worn by the user. In various embodiments, battery 1130, logic circuits 1140, and an optional motion sensor are enclosed inside of casing 1150. Battery 1130 is electronically coupled and supplies power to logic circuits 1140. By way of example, logic circuits 1140 may be implemented using printed circuit boards (PCBs).

In some embodiments, the antenna 1170 may be configured similar to the antenna 420 and may be positioned within the band portion 1108. In other embodiments, antenna 1170 may be part of the electronic capsule 1100 or embedded within the casing 1150. In another embodiment, a portion of the casing 1150 may itself be configured to function as an antenna. The antenna 1170 may function as a transmitting antenna, receiving antenna or transceiver antenna, depending on the intended use of the band 105.

Casing 1150 may be made of various materials known in the art, including, for example, molded plastic, silicone, rubber, or another moldable material. Additionally, casing 1150 may be sealing using an ultrasonic welding process to be substantially water tight, thus protecting electronic capsule 1150 from the elements. Further, band 105 may be configured to encircle a wrist or other limb (e.g., ankle, etc.) of a human or other animal or object. In one embodiment, band 105 is adjustable in size/fit. In some embodiments, cavity 1112 is notched on the radially inward facing side of band 105 and shaped to substantially the same dimensions as the profile of electronic capsule 1100. In addition, aperture 1106 may be located in the material of band 105 within cavity 1112. Aperture 1106 may be shaped to substantially the same dimensions as the profile of the finger biosensor 1120. As shown, cavity 1112 and aperture 1106 are in combination designed to detachably couple to electronic capsule 1100 such that, when electronic capsule 1100 is positioned inside cavity 1112, finger biosensor 1120 protrudes at least partially into aperture 1106 such that electronic capsule 1100 may be exposed to the touch of a user's finger. Electronic capsule 1100 may further include one or more magnets 1160 configured to secure electronic capsule 1100 in cavity 1112. Magnets 1160 may be concealed in casing 1150. Alternatively, cavity 1112 may be configured to conceal magnets 1160 when electronic capsule 1100 detachably couples in cavity 1112 and aperture 1106.

Band 105 may further include a ferromagnetic metal strip 1104 concealed in band portion 1108 within cavity 1112. In such a case, when electronic capsule 1100 is positioned within cavity 1112, magnets 1160 are attracted to ferromagnetic metal strip 1104 and pull electronic capsule 1100 radially outward with respect to band portion 1108. The force provided by magnets 1160 may detachably secure electronic capsule 1100 inside cavity 1112. In alternative embodiments, electronic capsule 1100 may be positioned inside cavity 1112 and be affixed therein using a form-fit, press-fit, snap-fit, friction-fit, VELCRO, or other temporary adhesion or attachment technology.

In some embodiments, logic circuits 1140 include a motion sensor that includes an inertial measurement unit (e.g., one or more of a gyroscope, accelerometer, and magnetometer, etc.), a wireless transmitter, and additional circuitry. Logic circuits 1140 may be configured to process electronic signals from biosensors (e.g., finger biosensor 1120 and wrist biosensor 1110) and/or motion sensors, convert/store the electronic signals as data, and output the data via the transmitter (e.g., using wireless protocols described herein). In other scenarios, this data may be output using a wired connection (e.g., USB, fiber optic, HDMI, or the like).

Referring again to electronic capsule 1100, in some embodiments, the electronic signals processed by logic circuits 1140 include an activation time signal and a recovery time signal. In these embodiments, logic circuits 1140 may process the electronic signals to calculate an activation recovery interval equal to the difference between the activation time signal and the recovery time signal. The electronic signals may include heart rate information collected by and received from one or more of the wrist biosensor 1110 and finger biosensor 1120. Further still, the electronic signals may include electro-cardio signals from a user's heart. In these embodiments, logic circuits 1140 may process the electro-cardio signals to calculate and store a RR-interval and determine a heart rate. The RR-interval may be the delta in time between two R-waves, where the R-waves are the electro-cardio signals generated by a ventricle contraction in the heart. The RR-interval may further be used to calculate and store a heart rate variability (HRV) value that indicates the variation over time of the time delta between consecutive heartbeats. In some embodiments, logic circuits 1140 may convey the electronic signals to, e.g., computing device 200, by a transmitter, such that computing device 200 may perform various calculations (e.g., of HRV).

In some instances, finger biosensor 1120 and wrist biosensor 1110 may be replaced or supplemented by a single biosensor configured to detect and measure biometric information. The single biosensor may be an optical biosensor such as a pulse oximeter configured to detect blood oxygen saturation levels. The pulse oximeter may output an electronic signal to logic circuits 1140 indicating a detected cardiac cycle phase and/or heart rate, and logic circuits 1140 may use such information (e.g. the cardiac cycle phase data) to further calculate an HRV value, or logic circuits 1140 may convey the information to, e.g., computing device 200, by a transmitter, such that computing device 200 may perform various calculations (e.g., of HRV).

Logic circuits 1140, in some deployments, may further detect and store metrics based on motion detection, such as the amount of physical activity, sleep, or rest, over a period of time, or the amount of time with or without physical activity over a period of time.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of example block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

One or more of the embodiments of the disclosure provided herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as flash memory, ROM chips or any type of solid-state non-volatile semiconductor memory) on which information is permanently stored; and (ii) writable storage media (e.g., any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A wearable electronic device comprising:
   a first earphone and a second earphone;
   a controller module that comprises:
   a printed circuit board having a ground plane;
   electrical components that include a transceiver; and
   an antenna configured to wirelessly communicate with an external electronic device, wherein the antenna has a loop shape and comprises a first connection point that is electrically connected to the ground plane and a second connection point that is electrically connected to the transceiver; and
   a cable having a first cable portion that includes one or more first conductors that electrically couple the electrical components of the controller module to the first earphone and a second cable portion that includes one or more second conductors that electrically couple the electrical components of the controller module to the second earphone, wherein
   the first cable portion comprises a first shield surrounding the one or more first conductors and having a first length,
   the second cable portion comprises a second shield surrounding the one or more second conductors and having a second length that is different from the first length,
   the first and second shields are electrically coupled to a first point and a second point on the ground plane of the printed circuit board, respectively, and
   the first length of the first cable portion and the second length of the second cable portion are designed to improve the efficiency of the antenna at a wireless communication frequency.

2. The wearable electronic device of claim 1, wherein the antenna further comprises a third connection point that is connected to the ground plane.

3. The wearable electronic device of claim 2,
   wherein the antenna has a first segment between the first and second connection points, a second segment between the second and third connection points, and a third segment between the first and third connection points; and
   wherein the first segment operates as a first pole and the second segment operates as a second pole in an inverted-F antenna and the third segment operates as a parasitic element to the inverted-F antenna.

4. The wearable electronic device of claim 3, wherein the first segment is longer than the second segment.

5. The wearable electronic device of claim 1, wherein the loop shaped antenna surrounds the printed circuit board.

6. The wearable electronic device of claim 1, further comprising a gap between the antenna surrounding the printed circuit board and the printed circuit board, wherein
   the gap has a first size near a hot point that is formed on the antenna at the wireless communication frequency and a second size near a non-hot point that is formed on the antenna at the wireless communication frequency, and
   wherein the first size is larger than the second size.

7. The wearable electronic device of claim 1, wherein the antenna is a structural part of the controller module.

8. The wearable electronic device of claim 1, wherein the first length is shorter than the second length.

9. The wearable electronic device of claim 1, wherein
   a first distance between the first point on the ground plane and the second point on the ground plane and the first length are equal to about a wavelength of the wireless communication frequency received by or transmitted by the antenna.

10. The wearable electronic device of claim 1, wherein the antenna includes a first and a second aperture configured to allow the one or more first conductors and the one or more second conductors, respectively, to connect to the printed circuit board and the first and second shields to connect to the ground plane.

11. The wearable electronic device of claim 1, wherein the printed circuit board includes:
    a processor; and
    a memory coupled to the processor, wherein the memory contains instructions, which when executed by the processor, cause the transceiver to send or receive data via the antenna.

12. The wearable electronic device of claim 1, wherein the printed circuit board includes:
    one or more electronic modules; and
    a metallic enclosure that is mounted on the printed circuit board and covers the one or more electronic modules, wherein the metallic enclosure is connected to the ground plane of the printed circuit board and is formed from a highly permeable metal.

13. The wearable electronic device of claim 1,
    wherein the printed circuit board includes one or more biometric modules; and
    wherein the transceiver communicates information collected by the one or more biometric modules to an external device via the antenna.

14. A wearable electronic device comprising:
    a pair of earphones;
    a controller module that includes:
    a printed circuit board having a ground plane;
    a transceiver; and
    an antenna that is connected to the ground plane and the transceiver, wherein
    the antenna has a loop shape,
    the antenna includes a first, a second, and a third connection point, and
    the antenna is connected to the transceiver at the first connection point and to the ground plane at the second and third connection points; and
    a cable having a first cable portion and a second cable portion, each cable portion containing one or more conductors that couple the controller module to one of the pair of earphones, each cable portion having a shield surrounding the one or more conductors, wherein
    the shield in the first cable portion and the shield in the second cable portion are both electrically coupled to the ground plane of the printed circuit board,
    the shield in the first cable portion and the shield in the second cable portion have different lengths, and
    the length of the first cable portion and the length of the second cable portion are designed to improve the efficiency of the antenna at a wireless communication frequency.

15. The wearable electronic device of claim 14,
    wherein the antenna has a first segment between the first and second connection points, a second segment between the first and third connection points, and a third segment between the second and third connection points; and wherein the first segment operates as a first pole and the second segment operates as a second pole in an inverted-F antenna and the third segment operates as a parasitic element to the inverted-F antenna.

16. The wearable electronic device of claim 15, wherein the first segment is longer than the second segment.

17. The wearable electronic device of claim 14, wherein the antenna is a structural part of the controller module and the loop shape of the antenna surrounds the printed circuit board.

18. The wearable electronic device of claim 14, wherein the length of the shield in the first cable portion is shorter than the length of the shield in the second cable portion.

19. The wearable electronic device of claim 14, wherein the antenna includes a first and a second aperture configured to allow the one or more conductors of the first and second cable portions of the cable to connect to the printed circuit board and the shields of the first and second cable portions of the cable to connect to the ground plane.

20. The wearable electronic device of claim 14, wherein the printed circuit board includes:
   a processor; and
   a memory coupled to the processor, wherein the memory contains instructions, which when executed by the processor, cause the transceiver to send or receive data via the antenna.

* * * * *